US012638722B2

(12) United States Patent
Gan et al.

(10) Patent No.: US 12,638,722 B2
(45) Date of Patent: May 26, 2026

(54) ARRAY SUBSTRATE AND LIQUID CRYSTAL DISPLAY PANEL

(71) Applicants: Hefei Xinsheng Optoelectronics Technology Co., Ltd., Hefei (CN); BOE TECHNOLOGY GROUP CO., LTD., Beijing (CN)

(72) Inventors: Quan Gan, Beijing (CN); Ran Zhang, Beijing (CN); Yongcan Wang, Beijing (CN); Mingfei Zhang, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 165 days.

(21) Appl. No.: 18/681,841

(22) PCT Filed: Jun. 30, 2022

(86) PCT No.: PCT/CN2022/103074
§ 371 (c)(1),
(2) Date: Feb. 6, 2024

(87) PCT Pub. No.: WO2024/000492
PCT Pub. Date: Jan. 4, 2024

(65) Prior Publication Data
US 2025/0138370 A1 May 1, 2025

(51) Int. Cl.
*G02F 1/1337* (2006.01)
*G02F 1/1362* (2006.01)

(52) U.S. Cl.
CPC .. *G02F 1/133707* (2013.01); *G02F 1/136222* (2021.01); *G02F 1/136286* (2013.01)

(58) Field of Classification Search
CPC ......... G02F 1/133707; G02F 1/136222; G02F 1/136286
See application file for complete search history.

(56) References Cited

U.S. PATENT DOCUMENTS 8,072,569 B2    12/2011  Kaneko et al.
8,174,656 B2     5/2012  Shimomaki
(Continued)

FOREIGN PATENT DOCUMENTS

CN    101144951 A    3/2008
CN    101165575 A    4/2008
(Continued)

OTHER PUBLICATIONS

Written Opinion issued in Application No. PCT/CN2022/103074 dated Jan. 4, 2023 with English translation, (7p).
(Continued)

*Primary Examiner* — Anne M Hines
(74) *Attorney, Agent, or Firm* — Arch & Lake LLP

(57) ABSTRACT

An array substrate (ARR) includes a base substrate (BP), a first electrode layer (EDLA), an insulating layer (PVX) and a second electrode layer (EDLB) stacked in sequence; where one of the first electrode layer (EDLA) and the second electrode layer (EDLB) is provided with a slit electrode (SLD); the array substrate (ARR) further includes a plurality of data lines (DataL), and a part of the data lines (DataL) adjacent to the slit electrode (SLD) extends linearly along a column direction (DV); the slit electrode (SLD) is provided with a plurality of slits (SL), the slits (SL) include a first slit section (SLA), and an angle between an extending direction of the first slit section (SLA) and a row direction (DH) is in a range of 69° to 85°.

18 Claims, 10 Drawing Sheets

(56)     References Cited

U.S. PATENT DOCUMENTS

| | | | |
|---|---|---|---|
| 8,436,972 B2 | 5/2013 | Arai et al. | |
| 8,467,022 B2 | 6/2013 | Shimomaki | |
| 9,869,909 B2 | 1/2018 | Umeda et al. | |
| 10,394,090 B2 | 8/2019 | Wang | |
| 10,642,115 B2 | 5/2020 | Nakagawa | |
| 2008/0068539 A1 | 3/2008 | Kaneko et al. | |
| 2008/0074602 A1 | 3/2008 | Arai et al. | |
| 2010/0085287 A1 | 4/2010 | Shimomaki | |
| 2010/0103360 A1 | 4/2010 | Shimomaki | |
| 2010/0157222 A1* | 6/2010 | Arai | G02F 1/134363 349/123 |
| 2017/0003555 A1 | 1/2017 | Umeda et al. | |
| 2019/0011788 A1 | 1/2019 | Wang | |
| 2019/0302549 A1 | 10/2019 | Nakagawa | |

FOREIGN PATENT DOCUMENTS

| | | |
|---|---|---|
| CN | 101726908 A | 6/2010 |
| CN | 101183198 B | 9/2011 |
| CN | 104730788 A | 6/2015 |
| CN | 106324921 A | 1/2017 |
| CN | 106526990 A | 3/2017 |
| CN | 107422562 A | 12/2017 |
| CN | 107450201 B | 12/2020 |
| JP | 2010091826 A | 4/2010 |

OTHER PUBLICATIONS

International Search Report of PCT/CN2022/103074 dated Jan. 4, 2023 with English translation, (8p).

* cited by examiner

CTR

Control Component

LCD Panel ⟶ PNL

Backlight Module ⟶ BLU

BM

COML
SL
BB
SLD
EBLB

PVX

EBLA
GI
BP

CF
LC
ARR

PIXP        Dat.el        SD

ARRAY SUBSTRATE AND LIQUID CRYSTAL DISPLAY PANEL

CROSS REFERENCE

The present application is the U.S. national phase application of PCT Application No. PCT/CN2022/103074, filed Jun. 30, 2022 and titled "ARRAY SUBSTRATE AND LIQUID CRYSTAL DISPLAY PANEL," the entire content of which is incorporated herein by reference for all purposes.

TECHNICAL FIELD

This disclosure relates to the field of display technology, and specifically to an array substrate and a liquid crystal display (LCD) panel.

BACKGROUND

Contrast of current LCD panels is difficult to meet some high-demand application scenarios at large viewing angles. Therefore, it is necessary to develop display products with high contrast at large viewing angles.

It should be noted that the information disclosed in the above background section is only used to enhance understanding the background of this disclosure, and therefore may include information that does not constitute prior art known to those skilled in the art.

SUMMARY

This disclosure is directed to overcome the above-mentioned shortcomings of related art by providing an array substrate and an LCD panel, so as to improve the contrast of the LCD panel under a large viewing angle.

According to a first aspect of this disclosure, an array substrate is provided and includes a base substrate, a first electrode layer, an insulating layer and a second electrode layer stacked in sequence; where one of the first electrode layer and the second electrode layer is provided with a slit electrode; the array substrate further includes a plurality of data lines, and a part of the data lines adjacent to the slit electrode extends linearly along a column direction;

where the slit electrode is provided with a plurality of slits, the slits include a first slit section, and an angle between an extending direction of the first slit section and a row direction is in a range of 69° to 85°.

According to some embodiments of this disclosure, the angle between the extending direction of the first slit section and the row direction is between 79° and 85°.

According to some embodiments of this disclosure, the angle between the extending direction of the first slit section and the row direction is 79° or 83°.

According to some embodiments of this disclosure, at least part of the slits further includes at least one of a second slit section and a third slit section; the second slit section is connected to one end of the first slit section, and the third slit section is connected to another end of the first slit section; and along the column direction, the second slit section and the third slit section are respectively located on both sides of the first slit section;

an acute angle between a line, connecting one end of the second slit section away from the first slit section and one end of the first slit section away from the second slit section, and the row direction is smaller than an acute angle between the extending direction of the first slit section and the row direction; and an acute angle between a line, connecting one end of the third slit section away from the first slit section and one end of the first slit section away from the third slit section, and the row direction is smaller than the acute angle between the extending direction of the first slit section and the row direction.

According to some embodiments of this disclosure, at least part of the slits includes the second slit section, the first slit section and the third slit section connected in sequence.

According to some embodiments of this disclosure, an angle between an extending direction of the second slit section and the row direction is between 50° and 60°; and/or, an angle between an extending direction of the third slit section and the row direction is between 50° and 60°.

According to some embodiments of this disclosure, the second slit section has a same width as the first slit section and has a length smaller than the first slit section; and/or, the third slit section has a same width as the first slit section and has a length smaller than the first slit section.

According to some embodiments of this disclosure, the slit electrode includes a plurality of slit groups, and the slit group includes two of the slits having a common end;

along the row direction, the two of the slits in the slit group are located on a same side of the common end; and along the column direction, the two of the slits in the slit group are respectively located on both sides of the common end.

According to some embodiments of this disclosure, extending directions of the first slit sections of the two of the slits in the slit group are mirror-symmetrical with respect to the row direction.

According to some embodiments of this disclosure, any one of the slits in the slit group further includes a second slit section close to the common end; the first slit section of the any one of the slits is located on a side of the second slit section away from the common end; and an acute angle between a line, connecting one end of the second slit section away from the first slit section and one end of the first slit section away from the second slit section, and the row direction is smaller than an acute angle between the first slit section and the row direction.

According to some embodiments of this disclosure, extending directions of the second slit sections of the two of the slits the slit group are mirror-symmetrical with respect to the row direction.

According to some embodiments of this disclosure, among two slit electrodes adjacent in the row direction, extending directions of the first slit sections of the two slit electrodes are mirror-symmetrical with respect to the column direction.

According to some embodiments of this disclosure, among two slit electrodes adjacent in the column direction, extending directions of the first slit sections of the two slit electrodes are mirror-symmetrical with respect to the row direction.

According to some embodiments of this disclosure, among two slit electrodes adjacent in the row direction, extending directions of the first slit sections of the two slit electrodes are mirror-symmetrical with respect to the column direction; and among two slit electrodes adjacent in the column direction, extending directions of the first slit sections of the two slit electrodes are mirror-symmetrical with respect to the row direction.

According to some embodiments of this disclosure, a width of the first slit section is between 3.4 microns and 5.6 microns.

According to some embodiments of this disclosure, the slit electrode includes an electrode comb tooth located between two adjacent first slit sections, and a width of the electrode comb tooth is between 2.0 microns and 3.4 microns.

According to some embodiments of this disclosure, a ratio of a width of the first slit section to the width of the electrode comb tooth is between 1 and 2.4.

According to some embodiments of this disclosure, a width of the first slit section is between 4.1 and 4.5 microns; and the width of the electrode comb tooth is between 2.3 and 2.7 microns.

According to some embodiments of this disclosure, a width of the first slit section is between 4.4 and 4.6 microns; and the width of the electrode comb tooth is between 2.7 and 2.9 microns.

According to some embodiments of this disclosure, the slit electrode is located on the second electrode layer.

According to a second aspect of this disclosure, an LCD panel is provided and includes an array substrate and a color filter substrate arranged in box alignment, and a liquid crystal layer sandwiched between the array substrate and the color filter substrate.

It should be understood that the foregoing general description and the following detailed description are exemplary and explanatory only without limiting this disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure. Obviously, the drawings in the following description are only some embodiments of this disclosure. For those skilled in the art, other drawings can be obtained based on these drawings without exerting creative efforts.

DETAILED DESCRIPTION

Figure 1:
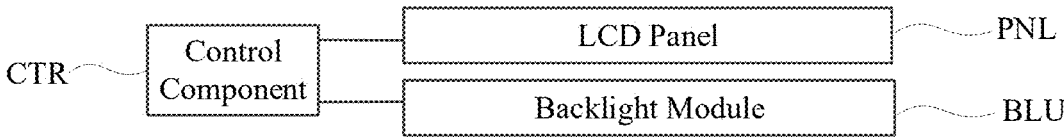
FIG. 1 is a schematic structural diagram of a display device according to some embodiments of this disclosure.

Exemplary embodiments will now be described more fully with reference to the accompanying drawings. Exemplary embodiments may, however, be embodied in various forms and should not be construed as limited to the embodiments set forth herein. Instead, these embodiments are provided so that this disclosure will be thorough and complete and will fully convey the concepts of the exemplary embodiments to those skilled in the art. The same reference numerals in the drawings indicate the same or similar structures, and thus their detailed descriptions will be omitted. Furthermore, the drawings are merely schematic illustrations of this disclosure and are not necessarily drawn to scale.

Although relative terms, such as "upper" and "lower" are used in this specification to describe the relative relationship of one component to another component as illustrated, these terms are used in this specification only for convenience, for example, according to direction of the example described in the drawings. It should be understood that if the illustrated device were turned upside down, the components described as "upper" would become components as "lower". When a structure is "on/above" another structure, it may mean that the structure is integrally formed on the another structure, or that the structure is "directly" placed on the another structure, or that the structure is "indirectly" placed on the another structure through yet another structure.

The terms "a", "an", "the", "said" and "at least one" are used to indicate the presence of one or more elements/components/etc.; the terms "include" and "have" are used to indicate an open-ended inclusive and mean that there may be additional elements/components/etc. in addition to those listed; the terms "first", "second", "third" etc. are only used as a marker without limiting the number of related objects.

A transistor is a component that includes at least three terminals: a gate, a drain, and a source. The transistor has a channel region between the drain (drain electrode terminal, drain region, or drain electrode) and the source (source electrode terminal, source region, or source electrode), and current can flow through the drain, the channel region, and the source. The channel region refers to a region through which the current mainly flows.

When referring to that a structural layer A is located on a side of a structural layer B away from a base substrate, it may be understood that the structural layer A is formed on the side of the structural layer B away from the base substrate. When the structural layer B is a patterned structure, partial structure of the structural layer A may also be located at the same physical height of the structural layer B or lower than the physical height of the structural layer B, where the base substrate is the height reference.

some embodiments of this disclosure provide an LCD device. Referring to FIG. 1, the LCD device includes an LCD panel PNL, a control component CTR, and a backlight module BLU. The control component CTR simultaneously drives the LCD panel PNL and the backlight module BLU.

Figure 2:
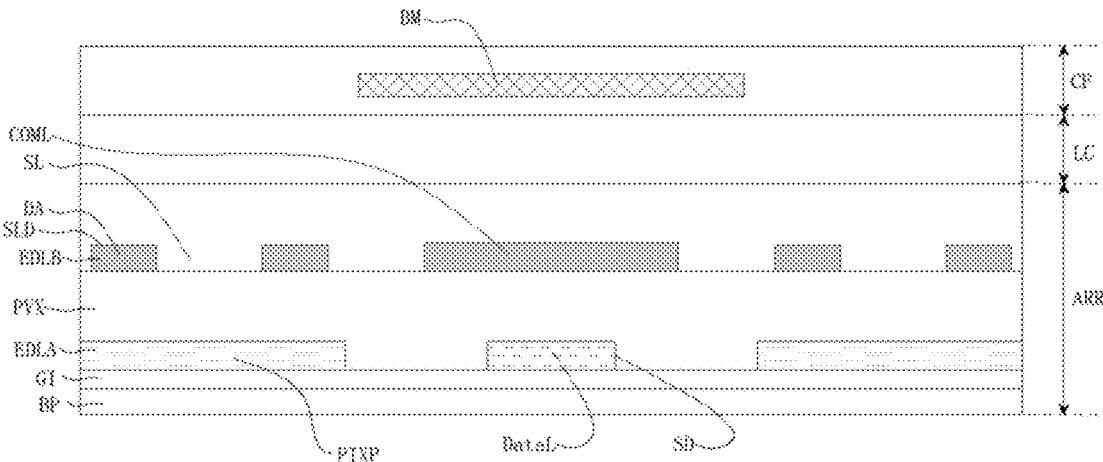
FIG. 2 is a schematic structural diagram of an LCD panel according to some embodiments of this disclosure.

From the perspective of the stacked structure, referring to FIG. 2, the LCD panel may include an array substrate ARR and a color filter substrate CF arranged in box alignment, and a liquid crystal layer LC is sandwiched between the array substrate and the color filter substrate. For example, the array substrate, the color filter substrate, and the sealant disposed therebetween define a closed box-shaped area, which is filled with liquid crystal to form the liquid crystal layer LC. The LCD panel further includes a lower polarizer located on a side of the array substrate away from the color filter substrate and an upper polarizer located on a side of the color filter substrate away from the array substrate. The array substrate is provided with pixel electrodes and a pixel driving circuit for loading data voltages to the pixel electrodes. A common electrode is provided on the array substrate or color filter substrate. By controlling the electric field strength between the pixel electrode and the common electrode, the degree of tilting or flipping of the liquid crystal within a corresponding range of the pixel electrode can be adjusted, then the polarization direction of the polarized light passing through the liquid crystal can be adjusted, and finally the light extraction rate of the LCD panel can be adjusted in the corresponding range of the pixel electrode.

Figure 3:
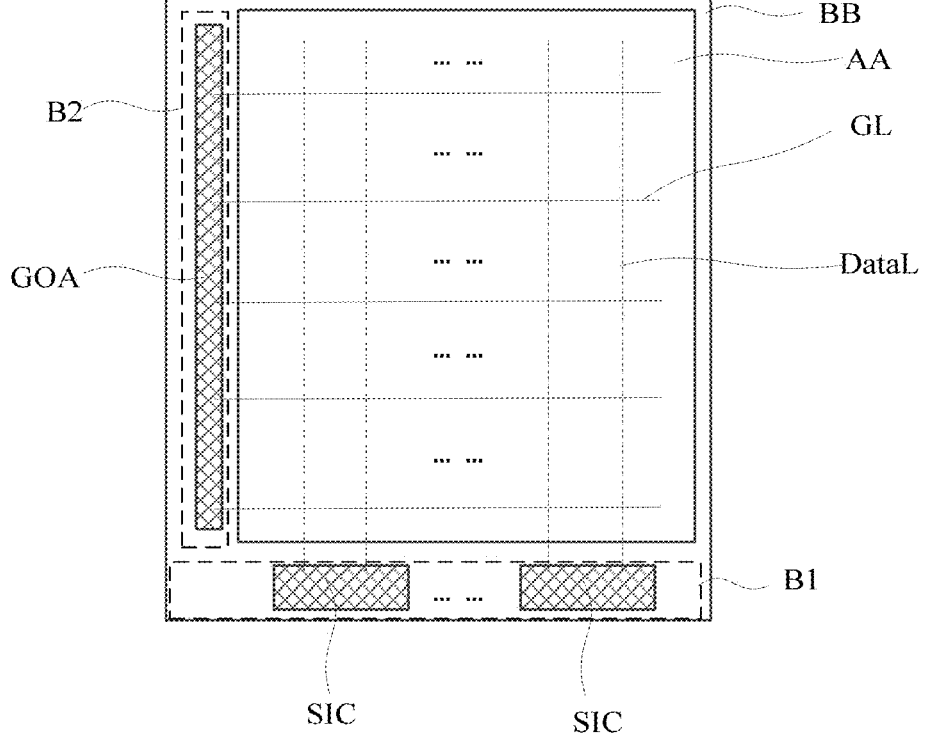
FIG. 3 is a partial structural diagram of an array substrate according to some embodiments of this disclosure.

FIG. 3 shows a schematic structural diagram of an LCD panel PNL according to some embodiments of this disclosure. From a planar perspective, the LCD panel PNL may include a display area AA and a peripheral area BB surrounding the display area AA. In the display area AA, the array substrate is provided with scanning lines GL extending in the row direction and data lines DataL extending in the column direction. The scanning lines GL and the data lines DataL define multiple pixel areas (e.g., Pixel area PIXA in FIG. 4), and the pixel electrode and the pixel driving circuit may be located in the pixel areas. In an example, the pixel driving circuit may be a thin film transistor serving as a switching transistor. One end of the switching transistor is electrically connected to the data line DataL, another end of the switching transistor is connected to the pixel electrode, and the gate of the switching transistor is connected to the scanning line GL. The peripheral area BB of the array substrate includes a first peripheral area B1 in which a source driving circuit SIC is bound, and a second peripheral area B2 in which a gate driving circuit GOA is provided. In some embodiments, the first peripheral area B1 extends along the column direction, and the second peripheral area B2 extends along the row direction. In some embodiments, the gate driving circuit GOA is electrically connected to respective scanning lines GL, and is configured to load the scanning signal to the scanning lines GL to turn on the switching transistor. The source driving circuit SIC is electrically connected to the data line DataL, and is configured to generate a data voltage based on display synchronization data and load the data voltage to the data line DataL.

Referring to FIG. 3, in an example, the number of source driving circuits SIC of the LCD panel PNL is more than one, and each source driving circuit SIC may drive multiple data lines DataL respectively. Further, the source driving circuit SIC may a chip; and the array substrate is provided with an FPC (flexible printed circuit) binding area and a source driving circuit binding area in the first peripheral area B1. The source driving circuit SIC may be bound within the source driving circuit binding area, and the source driving circuit binding area is electrically connected to the data line DataL and the FPC binding area through wiring. The FPC binding area may be bound and connected to the control component CTR through FPC. In this way, the signals and voltages of the control component CTR can be transmitted to the source driving circuit SIC through the FPC. Furthermore, the signal between the source driving circuit SIC and the control component CTR may be an LVDS (low voltage differential signal) or a mini LVDS, thereby reducing signal crosstalk.

Also, in other embodiments of this disclosure, the LCD panel PNL may also be in other structures. For example, the gate driving circuit GOA may not be provided on the array substrate but an additional gate driving circuit board may be bound thereto. For another example, the array substrate may be provided with gate driving circuits GOA on both sides of the row direction to reduce the scanning signal voltage drop or increase the scanning frequency. For another example, source driving circuits SIC are provided at both ends of the array substrate in the column direction to drive the LCD panel PNL on both sides, thereby reducing the voltage drop on the data line DataL in the large-size LCD panel PNL, especially the voltage drop on the data line DataL in a splicing screen. For another example, the source driving circuit SIC may not be provided on the LCD panel PNL, but may be provided on a COF (Chip On Film). This disclosure does not limit the relative positional relationship and arrangement form between the source driving circuit SIC and the LCD panel PNL, as long as the source driving circuit SIC can directly drive each pixel in the display area of the LCD panel PNL.

The backlight module BLU in an example of some embodiments of this disclosure may be a side-entry backlight source or a direct-type backlight source. In an example, the backlight module BLU may include a light panel. A control unit may be provided on the light panel. Each control unit includes a microchip and at least one light area controlled by the microchip. Respective light areas are distributed in an array, so that the backlight module BLU can present good luminous uniformity and debugging of backlight module BLU can be facilitated. Each light area has one or more light-emitting elements (such as Mini LED or Micro LED). When there are multiple light-emitting elements in the same light area, these light-emitting elements may be connected in series, in parallel, or in a series-parallel mixture, as long as respective light-emitting elements can be driven, for example, as long as respective light-emitting elements are in an electrical path with the same current amplitude, so that multiple light-emitting elements in the electrical path constitute a light-emitting circuit. In this disclosure, the microchip controls the overall brightness of the light areas by driving the brightness of respective light-emitting elements in the light areas. Optionally, the microchip controls the brightness of respective light-emitting elements in the light area under the control of the control component CTR, and then controls the brightness of the light areas, so that the brightness of the backlight module BLU and the display of the LCD panel PNL cooperate with each other to improve the display effects, such as increasing the contrast.

Also, the above example of the backlight module BLU may be an actively driven backlight module that can achieve local dimming of each light area through a microchip. In other embodiments of this disclosure, the backlight module BLU may not need to implement local dimming, or may adopt a passive driving manner to implement local dimming, or may adopt other active driving manners to implement local dimming.

According to some embodiments of this disclosure, referring to FIG. 2, the array substrate ARR may include a first electrode layer EDLA, an insulating layer PVX and a second electrode layer EDLB that are sequentially stacked on one side of the base substrate, where in any one pixel area PIXA, one of the first electrode layer EDLA and the second electrode layer EDLB may be provided with a slit electrode SLD, and the other one thereof may be provided with a plate electrode. An edge electric field is generated between the slit electrode SLD and the plate electrode, and is used to drive the liquid crystal in the liquid crystal layer to tilt or flip, thereby controlling light emission of the LCD panel in the pixel area PIXA.

In the first related technology, the data line DataL of the LCD panel PNL may be arranged at an angle, and the slit SL of the slit electrode SLD matches (i.e., is parallel to) the inclination direction of the data line DataL. In the second related technology, the data line DataL of the LCD panel PNL may be arranged in a straight line and extend along the column direction DV, and the slit SL of the slit electrode SLD may be inclined at a small angle to the row direction DH. As far as these two related technologies are concerned, the contrast of LCD panels PNL needs to be further improved; in particular, the contrast of display panels in related technologies at large viewing angles is difficult to meet some high-demand application scenarios. For example, in the field of vehicle-mounted displays, the contrast of the above-mentioned related technology products at a large viewing angle is difficult to meet relevant requirements.

Figure 4:
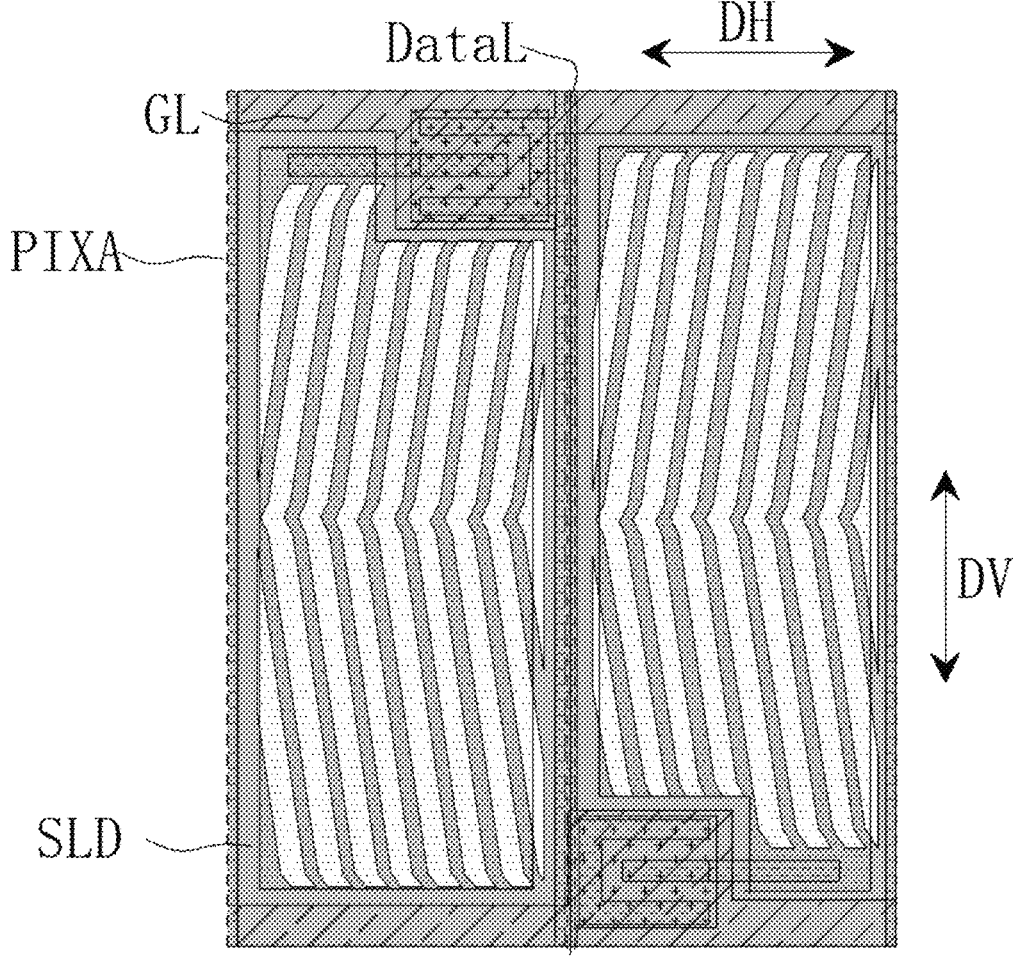
FIG. 4 is a partial structural diagram of an array substrate according to some embodiments of this disclosure.
Figure 5:
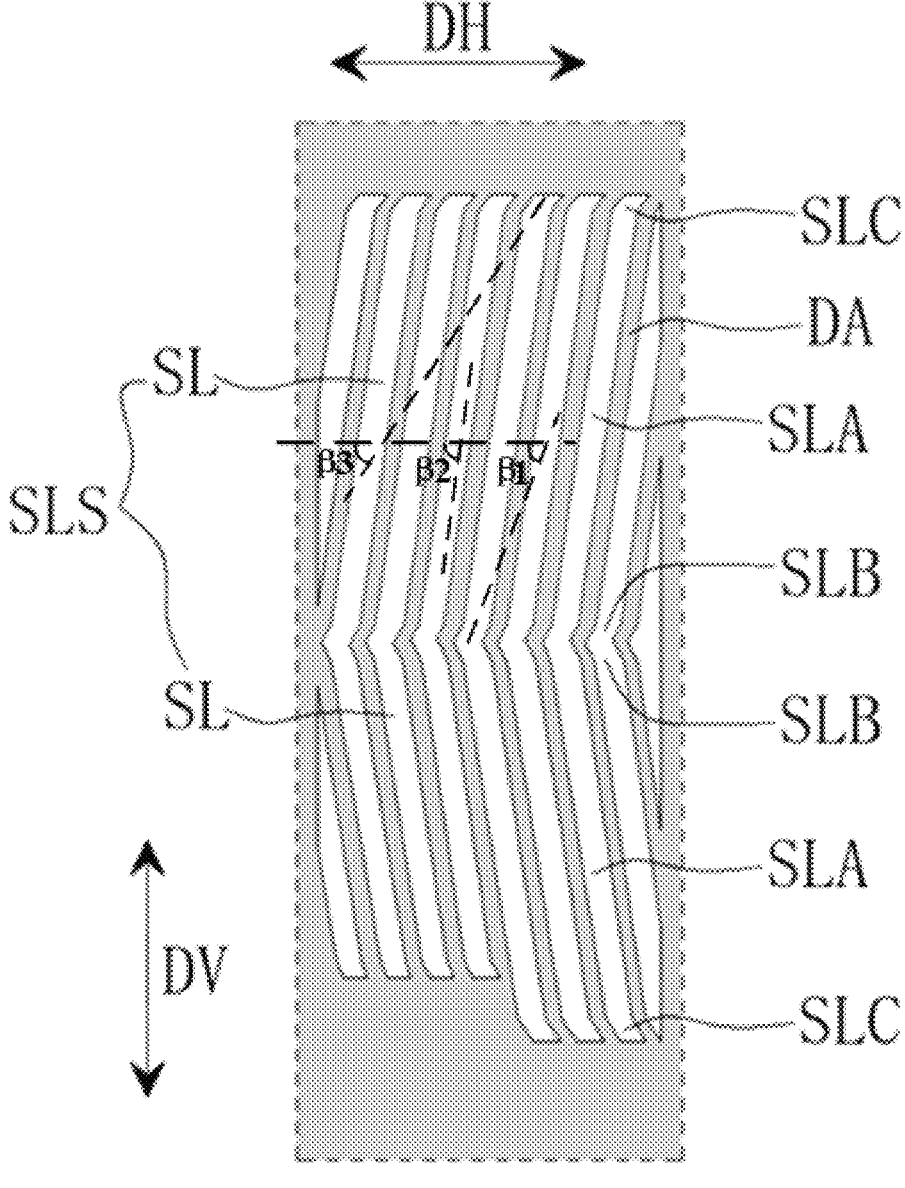
FIG. 5 is a schematic structural diagram of a slit electrode according to some embodiments of this disclosure.

This disclosure provides an LCD panel PNL. Referring to FIG. 2 to FIG. 4, the LCD panel PNL includes a base substrate BP, a first electrode layer EDLA, an insulating layer PVX and a second electrode layer EDLB that are stacked in sequence. One of the first electrode layer EDLA and the second electrode layer EDLB is provided with a slit electrode SLD. The LCD panel PNL further includes a plurality of data lines DataL, and a part of the data lines DataL adjacent to the slit electrode SLD extends linearly along the column direction DV. Referring to FIG. 5, the slit electrode SLD is provided with a plurality of slits SL, the slits SL include a first slit section SLA; and an angle between the extending direction of the first slit section SLA and the row direction DH is within the range of 69°-85°. In this way, in the LCD panel PNL of this disclosure, the data lines DataL are linearly arranged along the row direction DH, and the extending direction of the first slit section SLA of the slit electrode SLD is close to the column direction DV and is in a certain included angle with the column direction DV. Through the cooperation of the data line DataL and the first slit section SLA in the layout direction, the contrast of the LCD panel PNL can be improved while ensuring the light extraction rate and other indicators of the LCD panel PNL, especially the contrast of the LCD panel PNL at a wide viewing angle can be significantly improved, making the LCD panel PNL suitable for applications in high-demand fields such as automotive. For example, it can meet the requirements of high-end automotive specifications such as German 5.1. Also, this LCD panel PNL can also be used in consumer-grade products that have high requirements for display quality.

Figure 6:
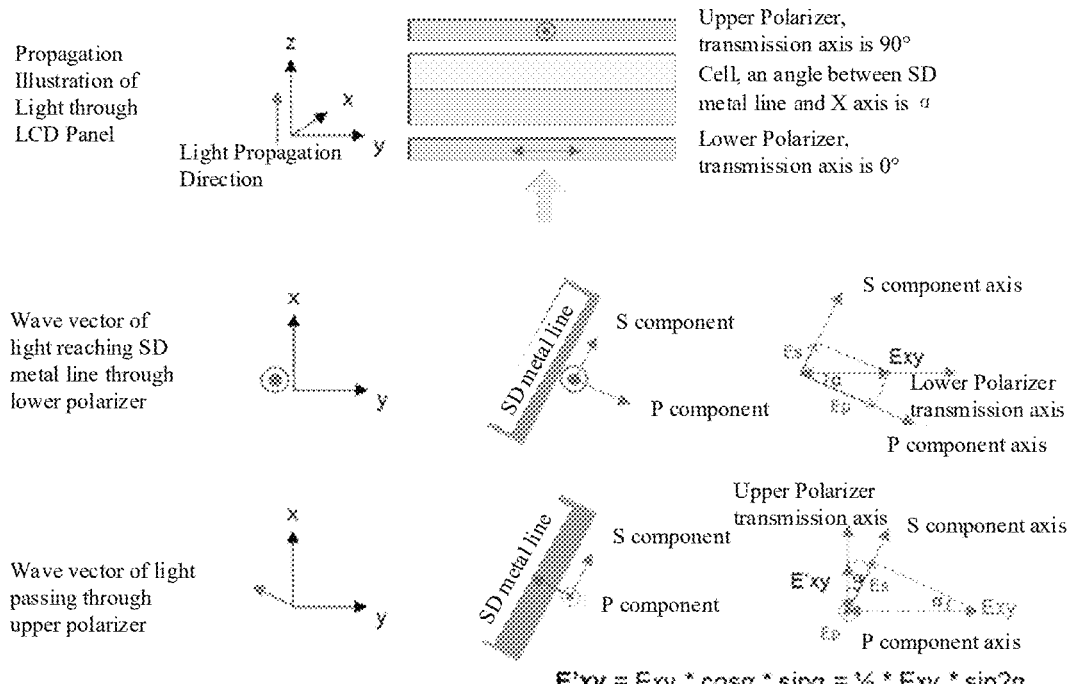
FIG. 6 is a schematic diagram of the principle of reducing light leakage for an array substrate according to some embodiments of this disclosure.

In FIG. 6, the principle by which some embodiments of this disclosure can improve the contrast of the LCD panel PNL is briefly explained. Referring to FIG. 6, the linearly polarized light Exy passing through the lower polarizer may have two components (S wave Es and P wave Ep), that is, S wave Es along the S component axis (parallel to the extending direction of the SD metal line) and P wave Ep along the P component axis (perpendicular to the extending direction of the SD metal line and parallel to the plane of the display panel). When the linearly polarized light Exy encounters the SD metal line (i.e., the data line DataL), the P wave Ep changes to the vertical direction (perpendicular to the display panel plane, that is, the Z direction), resulting in only the S wave Es in the display panel plane. The S wave Es may be further decomposed into a component Exy' in the transmission axis direction of the upper polarizer, and Exy' is the depolarization amount. Exy' can produce light leakage through the upper polarizer. According to a formula, when a is 45°, the larger Exy' is, the most serious light leakage is; when a is 0°, the Exy' is the smallest, and the light leakage is the slightest.

Compared with the first related technology, in some embodiments of this disclosure, the data line DataL is linearly arranged along the column direction DV, so that a is 0°, thereby making the light leakage of the LCD panel PNL small, and significantly improving the contrast of the LCD panel PNL, including but not limited to the contrast at large viewing angles.

Compared with the second related technology, the LCD panel PNL according to some embodiments of this disclosure exhibits better light efficiency in tests, thereby correspondingly making the LCD panel PNL of this disclosure have a greater contrast. Specifically, upon displaying, the LCD panel PNL according to this disclosure has a smaller dark pattern area than the second related technology. During the tests, it was found that, with the same design dimensions (e.g., the same slit width, the same electrode comb width, etc.), the light transmittance of the LCD panel PNL of this disclosure is higher than that of the second related technology by 8.7%, and the driving voltage of the LCD panel of this disclosure when reaching the maximum brightness is lower than that of the second related technology.

As follows, with reference to the accompanying drawings, the structure, principle and effect of the LCD panel PNL in some embodiments of this disclosure are further explained and described.

Referring to FIG. 2 and FIG. 4, the array substrate includes a first electrode layer EDLA and a second electrode layer EDLB. A bottom electrode is provided on the first electrode layer EDLA, and a top electrode corresponding to the bottom electrode is provided on the second electrode layer EDLB. Among the correspondingly arranged bottom electrodes and top electrodes, the orthographic projection of the bottom electrode on the base substrate BP at least partially coincide with the orthographic projection of the top electrode on the base substrate BP. In terms of electrode shapes, one of the bottom electrode and the top electrode may be a slit electrode SLD, and the other may be a plate electrode. That is, one of the first electrode layer EDLA and the second electrode layer EDLB may be provided with the slit electrode SLD, and the other may be provided with the plate electrode corresponding to the slit electrode SLD. Among the correspondingly arranged slit electrodes SLD and plate electrodes, the orthographic projection of the slit electrode SLD on the base substrate BP at least partially coincides with the orthographic projection of the plate electrode on the base substrate BP. At the functional level of electrodes, one of the bottom electrode and the top electrode may be a common electrode, and the other may be a pixel electrode. In other words, one of the first electrode layer EDLA and the second electrode layer EDLB may be a common electrode layer that is provided with a common electrode, and the other may be a pixel electrode layer that is provided with a pixel electrode.

Figure 10:
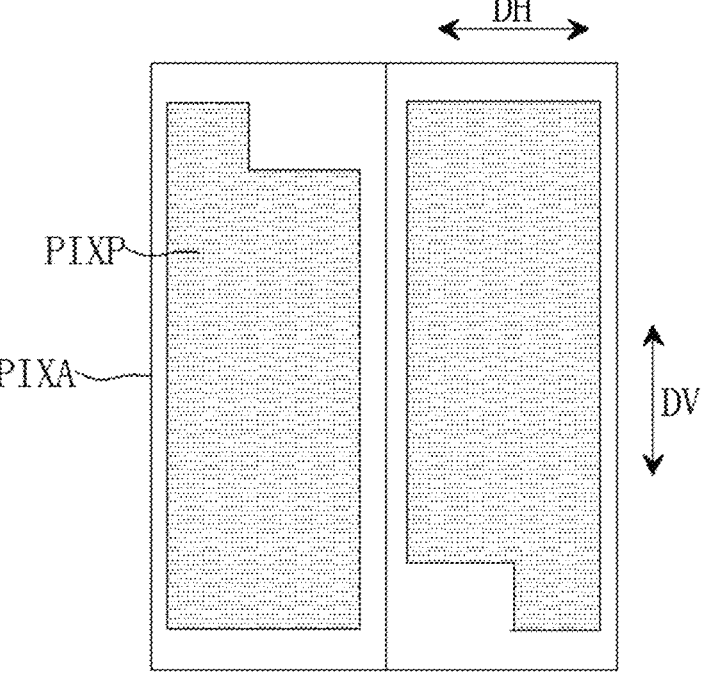
FIG. 10 is a partial schematic diagram of a first electrode layer of an array substrate according to some embodiments of this disclosure.
Figure 11:
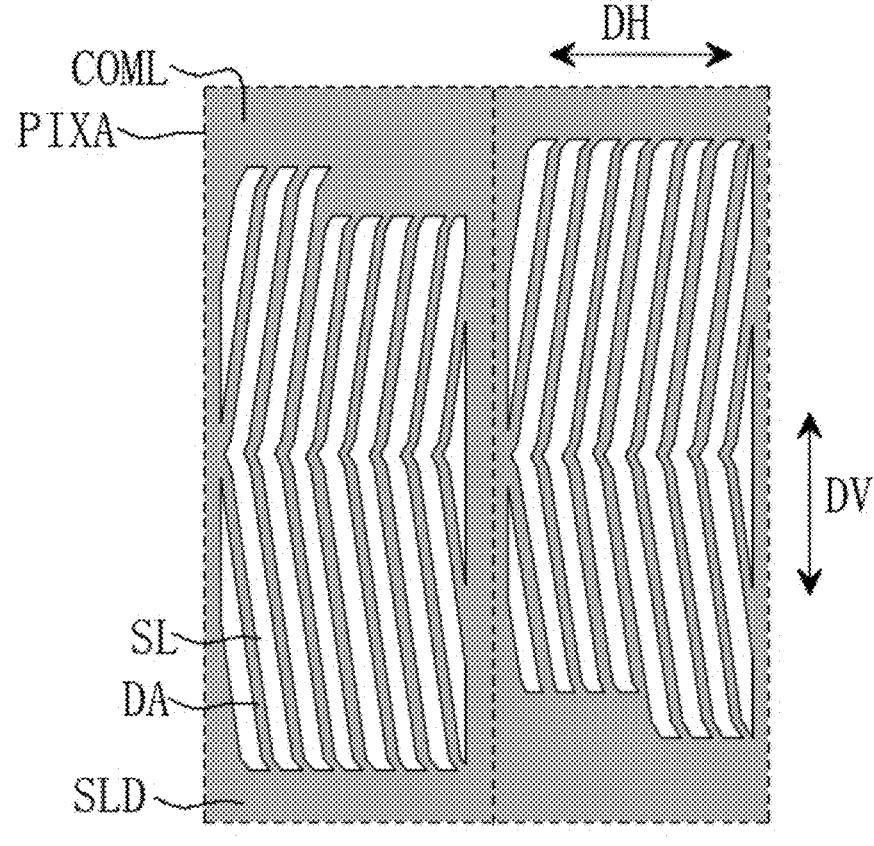
FIG. 11 is a partial schematic diagram of a second electrode layer of an array substrate according to some embodiments of this disclosure.

For example, according to some embodiments of this disclosure, referring to FIG. 2 and FIG. 10, the bottom electrode provided in the first electrode layer EDLA may be a plate electrode and may serve as the pixel electrode PIXP. Referring to FIG. 2 and FIG. 11, the top electrode provided in the second electrode layer EDLB may be a slit electrode SLD and may serve as the common electrode.

Optionally, in the array substrate of this disclosure, the material of the first electrode layer EDLA and the second electrode layer EDLB may be a transparent conductive material, such as a transparent metal oxide. For example, the material of the slit electrode SLD is ITO (indium tin oxide).

Referring to FIG. 3 and FIG. 4, the array substrate of this disclosure is provided with a plurality of scanning lines GL, a plurality of data lines DataL and a switching transistor connected to the pixel electrode; where one end of the switching transistor is connected to the data line DataL, another end of the switching transistor is connected to the pixel electrode, and the gate electrode thereof is connected to the scanning line GL. Under the control of the scanning voltage loaded on the scanning line GL, the switching transistor can be turned on, so that the data voltage on the data line DataL is loaded to the pixel electrode.

Referring to FIG. 4, a part of the data lines DataL adjacent to the slit electrode SLD extends linearly along the column direction DV. For example, the data line DataL extends linearly along the column direction DV as a whole; or a part of the data line DataL adjacent to the switching transistor may be bent and a part thereof close to the slit electrode SLD extends linearly along the column direction DV.

Figure 9:
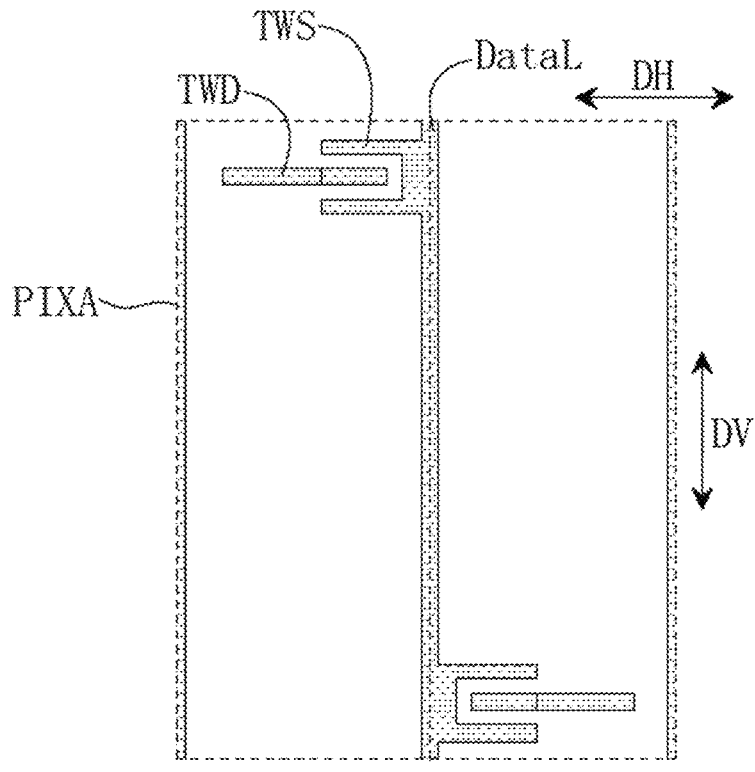
FIG. 9 is a partial schematic diagram of a source-drain metal layer of an array substrate according to some embodiments of this disclosure.

Exemplarily, in some embodiments of this disclosure, referring to FIG. 4 and FIG. 9, the data line DataL is a straight line and extends along the column direction; along the row direction, the data lines DataL are provided on both sides of the slit electrode SLD.

Figure 7:
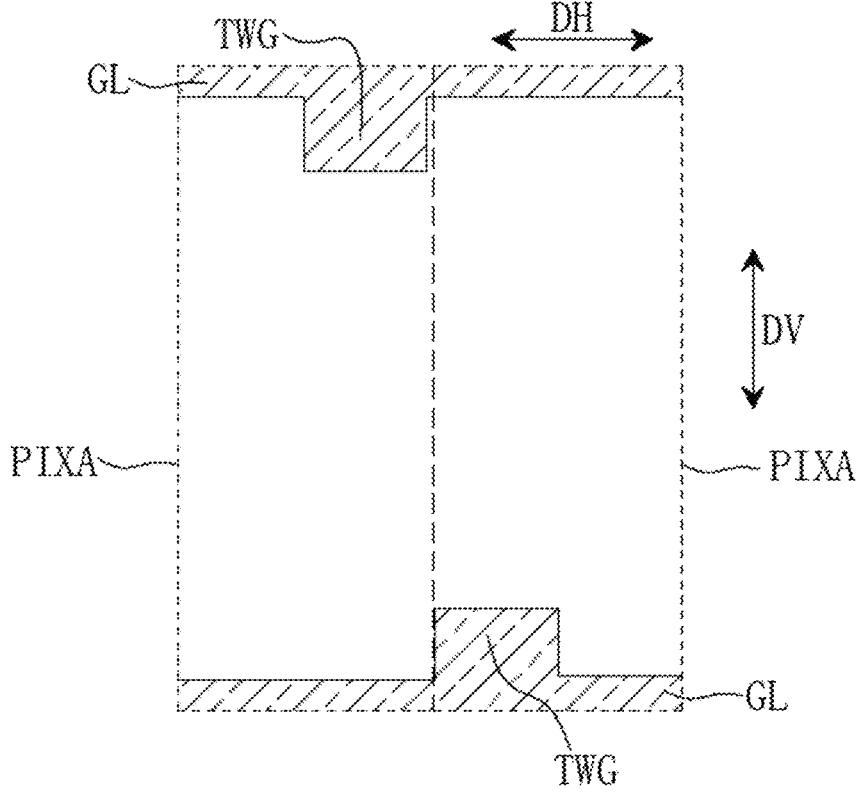
FIG. 7 is a partial schematic diagram of a gate layer of an array substrate according to some embodiments of this disclosure.

Optionally, referring to FIG. 4 and FIG. 7, the scanning line GL may extend along the row direction. The bottom electrode and the top electrode may be disposed between two adjacent scanning lines GL.

Figure 8:
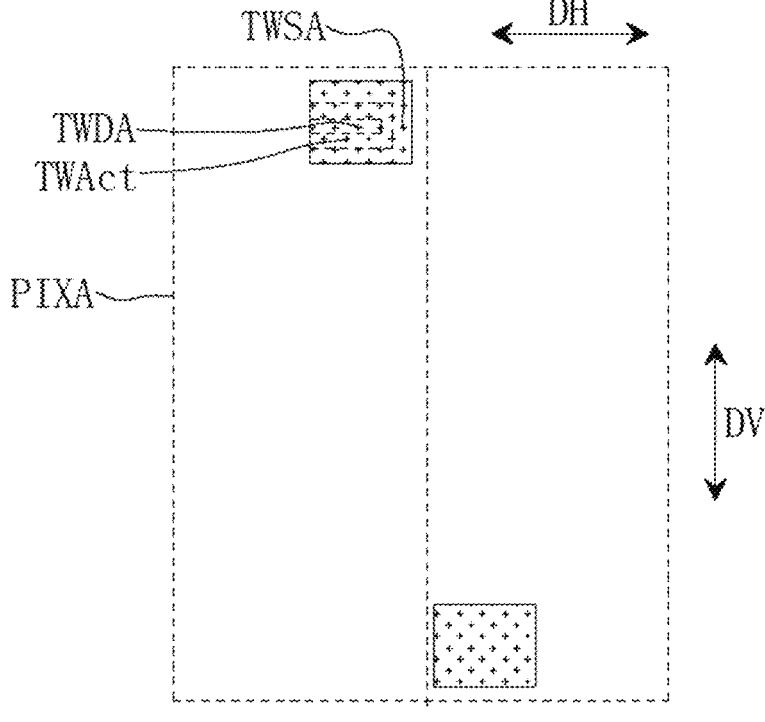
FIG. 8 is a partial schematic diagram of a semiconductor layer of an array substrate according to some embodiments of this disclosure.

In one example, referring to FIG. 7, the gate layer is provided with a scanning line GL and a gate TWG of a switching transistor electrically connected to the scanning line GL. Referring to FIG. 8, the semiconductor layer may include a source contact region TWSA of the switching transistor, a channel region TWAct of the switching transistor, and a drain contact region TWDA of the switching transistor connected in sequence. Referring to FIG. 9, the source-drain metal layer SD is provided with a source TWS of the switching transistor electrically connected to the data line DataL and is provided with a drain electrode TWD of the switching transistor. In some embodiments, the source TWS of the switching transistor and the source contact region TWSA of the switching transistor are electrically connected through a via hole, or the source TWS of the switching transistor is in direct contact and connection with the source contact region TWSA of the switching transistor. The drain TWD of the switching transistor and the drain contact region TWDA of the switching transistor are electrically connected through a via hole, or the drain TWD of the switching transistor is in direct contact and connection with the drain contact region TWDA of the switching transistor. The drain TWD of the switching transistor and the pixel electrode PIXP are electrically connected through a via hole, or the pixel electrode PIXP and the drain electrode TWD of the switching transistor are partially stacked. The gate TWG of the switching transistor overlaps with the channel region TWAct of the switching transistor, and a gate insulating layer GI is spaced between them.

In some embodiments of this disclosure, the active layer of the switching transistor is provided on the semiconductor layer, and its material may be an amorphous silicon semiconductor material, a polycrystalline silicon semiconductor material, a metal oxide semiconductor material, or an organic semiconductor material. For example, in some embodiments of this disclosure, the material of the active layer of the switching transistor may be a low-temperature polysilicon semiconductor material or amorphous silicon. In some embodiments, the source contact region and the drain contact region may be ion doped with high conductivity, while the channel region may maintain semiconductor characteristics and may be turned on or off in response to the scanning signal loaded on the gate.

In one example, the second electrode layer EDLB is a common electrode layer, and the second electrode layer EDLB is further provided with a common electrode line COML, where the top electrode is electrically connected to the common electrode line COML. Further, the color filter substrate CF is provided with a black matrix BM, and the black matrix BM covers the common electrode line COML.

Optionally, referring to FIG. 2, the common electrode line COML covers the data line DataL. In this way, by covering the common electrode line COML and the data line DataL with the black matrix BM, uneven brightness in the edge area of the pixel area PIXA can be avoided and the size and area of the pixel area PIXA can be limited.

In some embodiments of this disclosure, referring to FIG. 4, each data line DataL drives two rows of pixels, and each row of pixels is driven by two scanning lines GL. In this way, through the time-division driving of the two scanning lines GL for the pixels in the same row, the data on the data line DataL can be written into the pixel electrodes of two pixels in the same row.

In the example of FIG. 4, the second electrode layer EDLB is used as the common electrode layer and the slit electrode SLD is disposed on the second electrode layer EDLB. When preparing the array substrate, film layers including the gate layer (used to form the scanning line GL, the gate TWG of the switching transistor, etc.), the gate insulating layer GI, the semiconductor layer, and the first electrode layer EDLA, the source-drain metal layer SD, the insulating layer PVX and the second electrode layer EDLB may be sequentially prepared on one side of the base substrate BP. In some examples, the array substrate may further include an alignment layer covering the second electrode layer EDLB.

Figure 12:
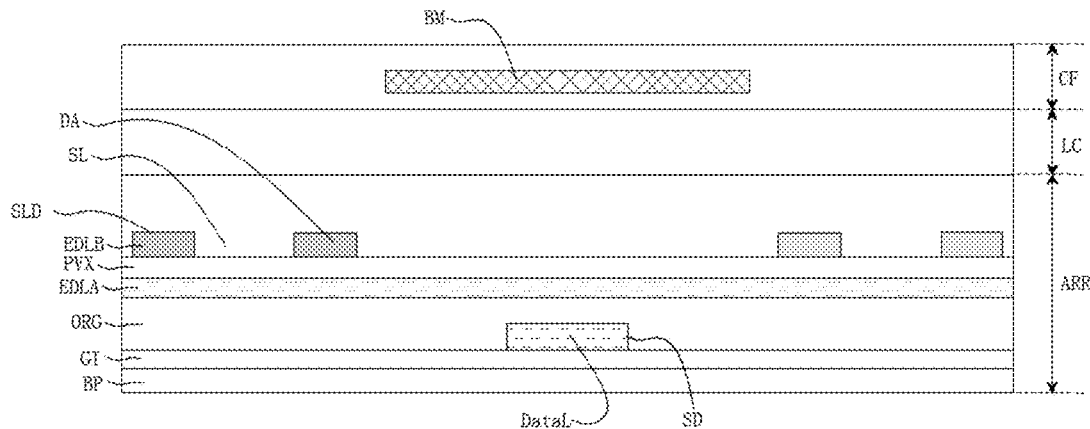
FIG. 12 is a partial structural diagram of an array substrate according to some embodiments of this disclosure.

In other embodiments of this disclosure, the LCD panel PNL may also be in other manners. For example, the second electrode layer EDLB may be a pixel electrode layer and the first electrode layer EDLA may be a common electrode layer. For another example, the bottom electrode may be a slit electrode SLD and the top electrode is a plate electrode. For example, referring to FIG. 12, the first electrode layer EDLA is a common electrode layer, and the bottom electrode provided therein may be used as a common electrode overlapping with the pixel electrode PIXP; the first electrode layer EDLA may also provided with a common electrode line COML connected to the bottom electrode, so as to load the bottom electrode with a common voltage. The second electrode layer EDLB is a pixel electrode layer, and the top electrode provided therein is a slit electrode SLD, and the slit electrode SLD and the bottom electrode are overlapped.

In some embodiments, an organic insulating layer ORG may be provided between the first electrode layer EDLA and the source-drain metal layer SD.

Referring to FIG. 5, the slit electrode SLD is provided with a plurality of slits SL, and the slit SL includes a first slit section SLA; an angle between the extending direction of the first slit section SLA and the row direction DH is within the range of 69°~85°. Furthermore, the angle between the extending direction of the first slit section SLA and the row direction DH is between 79° and 85°. In particular, the angle between the extending direction of the first slit section SLA and the row direction DH is 79° or 83°. In the LCD panel PNL of this disclosure, by limiting the tilt angle of the first slit section SLA, a balance can be achieved between the light efficiency (transmittance Tr) of the LCD panel PNL and the liquid crystal recovery time, so that the LCD panel PNL can have a high light efficiency while maintaining a fast recovery speed, thereby avoiding the impact on the refresh rate of the LCD panel PNL by roughly increasing the light efficiency and contrast.

Optionally, in the LCD panel PNL of this disclosure, within the feasible range of the inclination angle of the first slit section SLA, the light efficiency of the LCD panel PNL can be improved by increasing the inclination angle of the first slit section SLA (increasing the acute angle between the first slit section SLA and the row direction DH). In other words, the more vertical the first slit section SLA (the closer to the column direction DV), the higher the light extraction rate of the LCD panel PNL. Correspondingly, the refresh rate of the LCD panel PNL can be improved by reducing the inclination angle of the first slit section SLA.

According to some embodiments of this disclosure, referring to FIG. 5, at least part of the slits SL further includes at least one of a second slit section SLB and a third slit section SLC.

The second slit section SLB is connected to one end of the first slit section SLA, and the third slit section SLC is connected to the other end of the first slit section SLA. Along the column direction DV, the second slit section SLB and the third slit section SLC are respectively located on both sides of the first slit section SLA. An acute angle between a line, connecting one end of the second slit section SLB away from the first slit section SLA and one end of the first slit section SLA away from the second slit section SLB, and the row direction DH is smaller than an acute angle β2 between the first slit section SLA and the row direction DH. An acute angle between a line, connecting one end of the third slit section SLC away from the first slit section SLA and one end of the first slit section SLA away from the third slit section SLC, and the row direction DH is smaller than an acute angle β2 between the first slit section SLA and the row direction DH. In other words, an acute angle β1 between an extending direction of the second slit section SLB and the row direction DH is smaller than an acute angle β2 between the extending direction of the first slit section SLA and the row direction DH; and an acute angle β3 between an extending direction of the third slit section SLC and the row direction DH is smaller than the acute angle β2 between the extending direction of the first slit section SLA and the row direction DH.

In other words, some slits SL of the LCD panel PNL may be additionally provided with the second slit section SLB or the third slit section SLC in addition to the first slit section SLA according to requirements. In this way, the electric field at the edge of the pixel area PIXA can be balanced and the brightness uniformity of the PIX can be improved. It can be understood that in some embodiments of this disclosure, the second slit section SLB and the third slit section SLC are not necessary. The slit SL may only be provided with the first slit section SLA and the second slit section SLB, or may only be provided with the first slit section SLA and the third slit section SLC, or may only be provided with the first slit section SLA. Also, the second slit section SLB, the first slit section SLA and third slit section SLC, that are connected in sequence, may also be provided at the same time.

In some embodiments of this disclosure, at least part of the slits SL includes the second slit section SLB, the first slit section SLA and the third slit section SLC connected in sequence. For example, each of those slits SL not adjacent to the edge of the pixel area PIXA includes the second slit section SLB, the first slit section SLA and the third slit section SLC connected in sequence. In this way, the uniformity of brightness in the pixel area PIXA can be improved.

According to some embodiments of this disclosure, an angle between the second slit section SLB and the row direction DH is between 50° and 60°. Correspondingly, the angle between the third slit section SLC and the row direction DH is between 50° and 60°.

According to some embodiments of this disclosure, when the slit SL is provided with the second slit section SLB, the second slit section SLB has the same width as the first slit section SLA and a length smaller than the first slit section SLA. In this way, on the one hand, the brightness uniformity of the pixel area PIXA can be improved; on the other hand, the second slit section SLB can be prevented from being too large and affecting the light efficiency.

According to some embodiments of this disclosure, when the slit SL is provided with the third slit section SLC, the third slit section SLC has the same width as the first slit section SLA and a length smaller than the first slit section SLA. In this way, on the one hand, the brightness uniformity of the pixel area PIXA can be improved; on the other hand, the third slit section SLC can be prevented from being too large and affecting the light efficiency.

According to some embodiments of this disclosure, referring to FIG. 5, the slit electrode SLD includes a plurality of slit groups SLS, and the slit group SLS includes two slits SL having a common end. Along the row direction DH, the two slits SL of the slit group SLS are located on the same side of the common end; along the column direction DV, the two slits SL of the slit group SLS are respectively located on both sides of the common end. In this way, 1P (one pixel) and 2D (two domain areas) can be realized in the pixel area PIXA, thereby improving the viewing angle of the LCD panel PNL. In this way, the LCD panel PNL of this disclosure can achieve a large viewing angle and high contrast, especially high contrast at the large viewing angle. Furthermore, in some embodiments, the resolution of the LCD panel PNL may not be too high, for example, the PPI may not be greater than 280, so as to improve the manufacturability of the LCD panel PNL.

In one example, referring to FIG. 5, extending directions of the first slit sections SLA of the two slits SL in the slit group SLS are mirror-symmetrical with respect to the row direction DH. In this way, the uniformity of different domain areas can be improved, thereby improving the display uniformity under viewing angles in different directions.

In one example, referring to FIG. 5, any one of the slits SL in the slit group SLS further includes the second slit section SLB close to the common end; the first slit section SLA of this slit SL is located on the side of the second slit section SLB away from the common end. An acute angle between a line, connecting one end of the second slit SLB section away from the first slit section SLA and one end of the first slit section SLA away from the second slit section SLB, and the row direction DH is smaller than an acute angle β2 between the first slit section SLA and the row direction DH. In other words, the acute angle β1 between the extending direction of the second slit section SLB and the row direction DH is smaller than the acute angle β2 between the extending direction of the first slit section SLA. In this way, the light extraction rate at the connection of the two slits SL can be basically consistent with that of other areas, thereby improving the uniformity of brightness in the pixel area PIXA, and avoiding sudden changes in light efficiency caused by sudden changes in the angle of the slit SL.

In one example, the extending directions of the second slit sections SLB of the two slits SL in the slit group SLS are mirror-symmetrical with respect to the row direction DH.

In other embodiments of this disclosure, the LCD panel PNL can also adopt a 2P2D (2 pixels, 2 domain areas) or 4P4D (4 pixels, 4 domain areas) architecture to improve the viewing angle, for example, in a higher resolution display panel (such as display panels with a PPI greater than 280) or in products that do not have high requirements for display quality.

Figure 13:
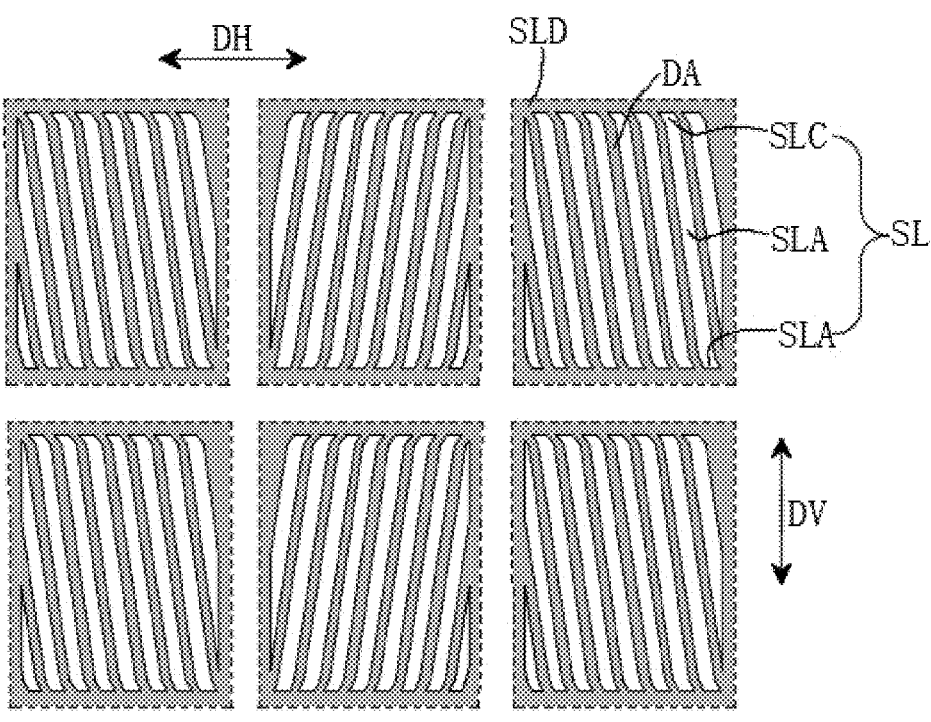
FIG. 13 is a schematic diagram of an arrangement of slit electrodes according to some embodiments of this disclosure.

In one example, referring to FIG. 13, as to two slit electrodes SLD adjacent in the row direction DH, the extending directions of the first slit sections SLA of the two slit electrodes SLD are mirror-symmetrical with respect to the column direction DV. In this way, the 2P2D effect can be achieved.

Figure 14:
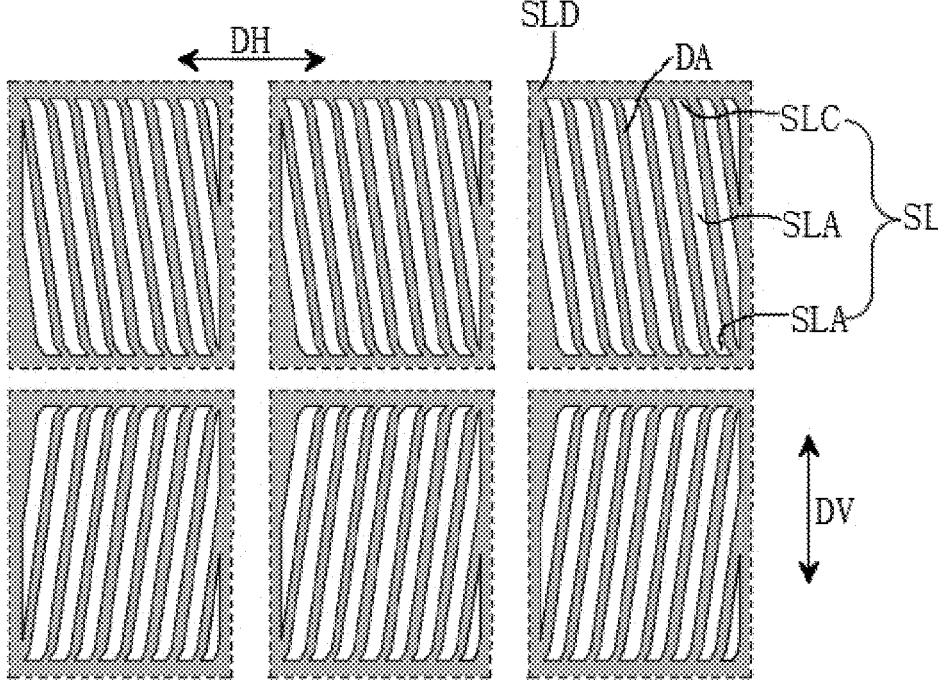
FIG. 14 is a schematic diagram of an arrangement of slit electrodes according to some embodiments of this disclosure.

In another example, referring to FIG. 14, as to two slit electrodes SLD adjacent in the column direction DV, the extending directions of the first slit sections SLA of the two slit electrodes SLD are mirror-symmetrical with respect to the row direction DH. In this way, the 2P2D effect can be achieved.

Figure 15:
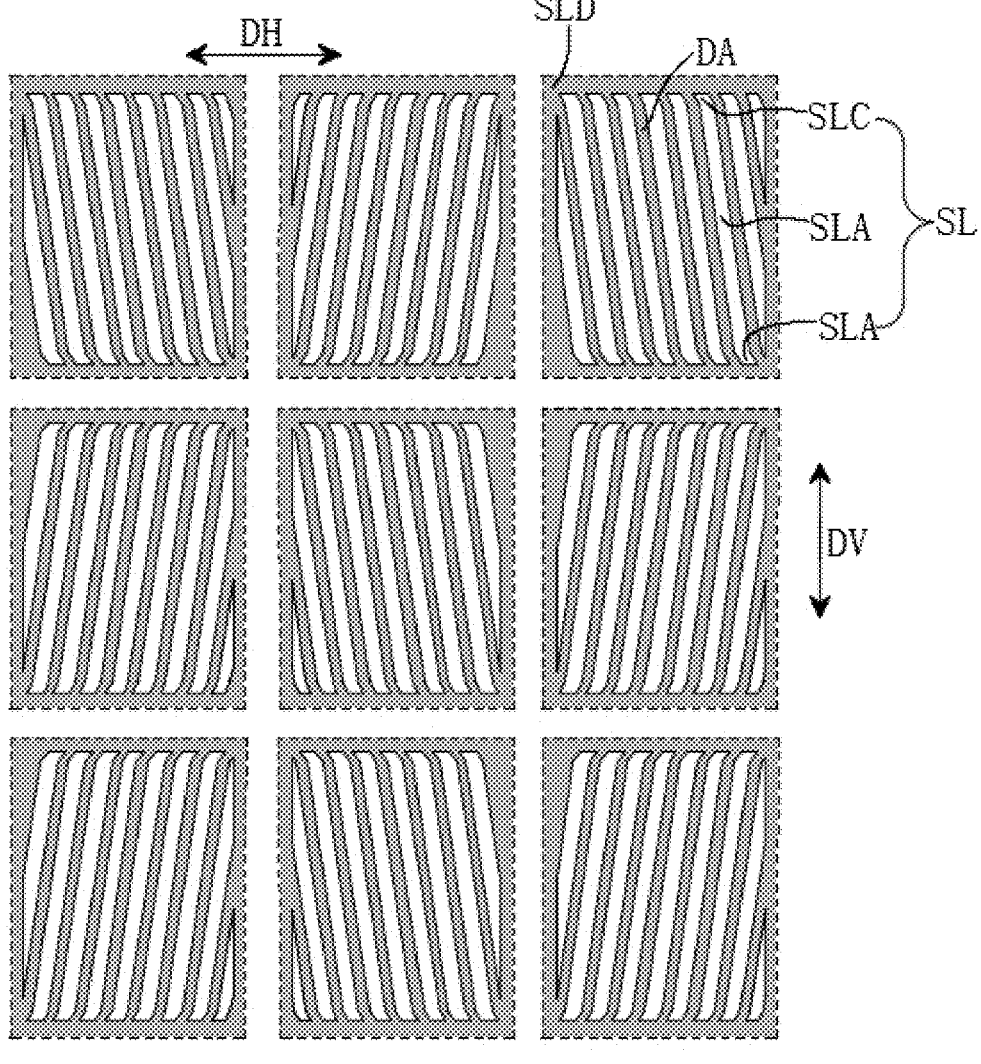
FIG. 15 is a schematic diagram of an arrangement of slit electrodes according to some embodiments of this disclosure.

In another example, referring to FIG. 15, as to two slit electrodes SLD adjacent in the row direction DH, the extending directions of the first slit sections SLA of the two slit electrodes SLD are mirror-symmetrical with respect to the column direction DV; and as to two slit electrodes SLD adjacent in the column direction DV, the extending directions of the first slit sections SLA of the two slit electrodes Also, for different LCD panels PNL, such as LCD panels PNL with different PPIs or different pixel sizes, the width of the first slit section SLA, the width of the electrode comb tooth DA, or the ratio of the width of the first slit section SLA to the width of the electrode comb tooth DA may be adjusted as needed to balance the quality of the LCD panel PNL.

In one example, the width of the first slit section SLA is between 4.1 and 4.5 microns; the width of the electrode comb tooth DA is between 2.3 and 2.7 microns. In this way, the LCD panel PNL can have relatively high light efficiency and good recovery time.

In another example, the slit electrode is the common electrode, and a common electrode line COML is provided between adjacent slit electrodes along the row direction. The width of the first slit section SLA is 3.8 microns, the width of the electrode comb tooth DA is 2.7 microns; the common electrode line COML has a width of 9.6 microns and covers the data line DataL. The width of the data line DataL is 3.5 microns, which makes the common electrode line COML exceed the data line DataL by 3.05 microns on each side. The pixel electrode is a plate-shaped electrode and is located on the first electrode layer. The distance between the edge of the pixel electrode and the data line DataL is 4.35 microns. A black matrix is provided on the color filter substrate. Along the row direction, the black matrix BM between two pixels has a width of 7.0 microns, and exceeds the data line DataL by 1.75 microns on each side.

In other embodiments of this disclosure, the width of the first slit section SLA is between 4.4 and 4.6 microns; the width of the electrode comb tooth DA is between 2.7 and 2.9 microns. In this way, the LCD panel PNL can also have relatively high light efficiency and good recovery time.

In some embodiments of this disclosure, the effects of different sizes of the first slit section SLA and the electrode comb tooth DA on the light efficiency of the LCD panel PNL are also tested.

For example, in a first set of tests, test cases 1 to 6 are tested in sequence. Table 1 can be referred to for specific data.

TABLE 1

| Items | Pitch | W | S | Spaces | | Total Width | Vop | Tr | Tr(%) |
|---|---|---|---|---|---|---|---|---|---|
| Test case 1 | 7.35 | 2.9 | 4.55 | 4.45 | 4.45 | 41.2 | 7.4 | 0.28591 | 103.5% |
| Test case 2 | 7.8 | 2.9 | 4.9 | 7.45 | 7.45 | 41.2 | 7.3 | 0.273009 | 99.0% |
| Test case 3 | 8.8 | 2.9 | 5.9 | 5.95 | 5.95 | 41.2 | 7.3 | 0.275047 | 99.5% |
| Test case 4 | 8.8 | 3.2 | 5.6 | 5.8 | 5.8 | 41.2 | 7.3 | 0.275868 | 100% |
| Test case 5 | 7.15 | 2.7 | 4.45 | 4.95 | 4.95 | 41.2 | 7.4 | 0.285857 | 103.5% |
| Test case 6 (reference case) | 7.5 | 2.9 | 4.6 | 4.625 | 4.625 | 34.65 | 7.3 | 0.275753 | 100% |

SLD are mirror-symmetrical with respect to the row direction DH. In this way, the 4P4D effect can be achieved.

According to some embodiments of this disclosure, the width of the first slit section SLA is between 3.4 microns and 5.6 microns.

According to some embodiments of this disclosure, the slit electrode SLD includes an electrode comb tooth DA located between two adjacent first slit sections SLA, and the width of the electrode comb tooth DA is between 2.0 microns and 3.4 microns.

According to some embodiments of this disclosure, the ratio of the width of the first slit section SLA to the width of the electrode comb tooth DA is between 1 and 2.4.

Herein, W is the width of the electrode comb tooth DA; S is the width of the first slit section SLA; Pitch is the setting pitch, which is W+S; the two Spaces are distances between two outermost slits SL along the row direction and the edge of the corresponding bottom electrode; the total width is the size of the slit electrode along the row direction. W, S, Pitch, Spaces, and total width are in the unit of microns. Vop is the driving voltage when the pixel reaches its maximum brightness, and is in the unit of V. Tr is the light efficiency (light transmittance); Tr (%) refers to the normalized data of the light efficiency of each test case based on the light efficiency of test case 6 (100%) serving as the reference.

According to the data in Table 1, it can be seen that by optimizing the width of the electrode comb tooth DA and the width of the first slit section SLA, such as the optimization in test cases 1 and 5, the light extraction rate of the LCD panel PNL can be improved.

As another example, in the second set of tests, multiple different test cases are tested. Table 2 can be referred to for specific data. Each row represents the parameters of the slit electrode and related test results in a test case. In this second set of tests, each slit electrode is provided with 8 slits.

TABLE 2

| Pitch(μm) | W(μm) | S(μm) | 2ITO-2TIO | W/S | Vop(V) | Normalized Brightness |
|---|---|---|---|---|---|---|
| 6.8 | 2 | 4.8 | 13.43 | 41.67% | 6.0 V | 99.3% |
| 6.8 | 2.1 | 4.7 | 13.33 | 44.68% | 5.9 v | 99.7% |
| 6.8 | 2.2 | 4.6 | 13.23 | 47.83% | 5.9 v | 99.8% |
| 6.8 | 2.3 | 4.5 | 13.13 | 51.11% | 5.9 v | 100.0% |
| 6.8 | 2.4 | 4.4 | 13.03 | 54.55% | 5.9 v | 100.2% |
| 6.8 | 2.5 | 4.3 | 12.93 | 58.14% | 5.9 v | 100.1% |
| 6.8 | 2.6 | 4.2 | 12.83 | 61.90% | 5.9 v | 100.0% |
| 6.8 | 2.7 | 4.1 | 12.73 | 65.85% | 5.9 v | 99.8% |
| 6.8 | 2.8 | 4 | 12.63 | 70.00% | 5.9 v | 99.6% |
| 6.8 | 2.9 | 3.9 | 12.53 | 74.36% | 5.9 v | 99.2% |
| 6.8 | 3 | 3.8 | 12.43 | 78.95% | 5.9 v | 98.6% |
| 6.8 | 3.1 | 3.7 | 12.33 | 83.78% | 6.0 V | 98.0% |
| 6.8 | 3.2 | 3.6 | 12.23 | 88.89% | 6.1 V | 97.3% |
| 6.8 | 3.3 | 3.5 | 12.13 | 94.29% | 6.1 V | 96.4% |
| 6.8 | 3.4 | 3.4 | 12.03 | 100.00% | 6.2 V | 95.2% |
| 7 | 2.4 | 4.6 | 11.63 | 52.17% | 5.8 v | 98.7% |
| 7 | 2.5 | 4.5 | 11.53 | 55.56% | 5.8 v | 98.7% |
| 7 | 2.6 | 4.4 | 11.43 | 59.09% | 5.8 v | 98.5% |
| 7 | 2.7 | 4.3 | 11.33 | 62.79% | 5.8 v | 98.3% |

In Table 2, 2ITO-2ITO represents the spacing between two slit electrodes. It can be seen from Table 2 that when W is 2 microns and S is 4.2 microns, the LCD panel PNL can have higher brightness. In other tests it is found that this setting can also reduce brightness fluctuations, thereby achieving a balance between brightness fluctuation and high light efficiency.

Other embodiments of the disclosure will be readily apparent to those skilled in the art from consideration of the specification and practice of the invention disclosed herein. This application is intended to cover any variations, uses, or adaptations of the disclosure that follow the general principles of the disclosure and include common knowledge or customary technical means in the technical field that are not disclosed in the disclosure. The specification and examples are considered as exemplary only.

What is claimed is:

1. An array substrate, comprising a base substrate, a first electrode layer, an insulating layer and a second electrode layer stacked in sequence; wherein one of the first electrode layer and the second electrode layer is provided with a slit electrode; the array substrate further comprises a plurality of data lines, and a part of the data lines adjacent to the slit electrode extends linearly along a column direction;

wherein the slit electrode is provided with a plurality of slits, the slits comprise a first slit section, and an angle between an extending direction of the first slit section and a row direction is in a range of 69° to 85°;

wherein, among two of the slits adjacent in the row direction, extending directions of the first slit sections of the two of the slits are mirror-symmetrical with respect to the column direction; or among two of the slits adjacent in the column direction, extending directions of the first slit sections of the two of the slits are mirror-symmetrical with respect to the row direction.

2. The array substrate according to claim 1, wherein the angle between the extending direction of the first slit section and the row direction is between 79° and 85°.

3. The array substrate according to claim 1, wherein the angle between the extending direction of the first slit section and the row direction is 79° or 83°.

4. The array substrate according to claim 1, wherein at least part of the slits further comprises at least one of a second slit section and a third slit section; the second slit section is connected to one end of the first slit section, and the third slit section is connected to another end of the first slit section; and along the column direction, the second slit section and the third slit section are respectively located on both sides of the first slit section;

an acute angle between an extending direction of the second slit section and the row direction is smaller than an acute angle between the extending direction of the first slit section and the row direction; and an acute angle between an extending direction of the third slit section and the row direction is smaller than the acute angle between the extending direction of the first slit section and the row direction.

5. The array substrate according to claim 4, wherein at least part of the slits comprises the second slit section, the first slit section and the third slit section connected in sequence.

6. The array substrate according to claim 4, wherein an angle between an extending direction of the second slit section and the row direction is between 50° and 60°; and/or, an angle between an extending direction of the third slit section and the row direction is between 50° and 60°.

7. The array substrate according to claim 4, wherein the second slit section has a same width as the first slit section and has a length smaller than the first slit section; and/or, the third slit section has a same width as the first slit section and has a length smaller than the first slit section.

8. The array substrate according to claim 1, wherein the slit electrode comprises a plurality of slit groups, and the slit group comprises two of the slits having a common end;

along the row direction, the two of the slits in the slit group are located on a same side of the common end; and along the column direction, the two of the slits in the slit group are respectively located on both sides of the common end.

9. The array substrate according to claim 8, wherein extending directions of the first slit sections of the two of the slits in the slit group are mirror-symmetrical with respect to the row direction.

10. The array substrate according to claim 8, wherein any one of the slits in the slit group further comprises a second slit section close to the common end; the first slit section of the any one of the slits is located on a side of the second slit section away from the common end; and an acute angle between an extending direction of the second slit section and the row direction is smaller than an acute angle between the extending direction of the first slit section and the row direction.

11. The array substrate according to claim 10, wherein extending directions of the second slit sections of the two of the slits the slit group are mirror-symmetrical with respect to the row direction.

12. The array substrate according to claim 1, wherein extending directions of the first slit sections of two of the slits, adjacent in the row direction, are mirror-symmetrical with respect to the column direction; and extending directions of the first slit sections of two of the slits, adjacent in the column direction, are mirror-symmetrical with respect to the row direction.

13. The array substrate according to claim 1, wherein a width of the first slit section is between 3.4 microns and 5.6 microns.

14. The array substrate according to claim 1, wherein the slit electrode comprises an electrode comb tooth located between two adjacent first slit sections, and a width of the electrode comb tooth is between 2.0 microns and 3.4 microns.

15. The array substrate according to claim 14, wherein a ratio of a width of the first slit section to the width of the electrode comb tooth is between 1 and 2.4.

16. The array substrate according to claim 14, wherein a width of the first slit section is between 4.1 and 4.5 microns; and the width of the electrode comb tooth is between 2.3 and 2.7 microns; or wherein a width of the first slit section is between 4.4 and 4.6 microns; and the width of the electrode comb tooth is between 2.7 and 2.9 microns.

17. The array substrate according to claim 1, wherein the slit electrode is located on the second electrode layer.

18. A liquid crystal display (LCD) panel, comprising an array substrate and a color filter substrate arranged in box alignment, and a liquid crystal layer sandwiched between the array substrate and the color filter substrate; wherein the array substrate comprises a base substrate, a first electrode layer, an insulating layer and a second electrode layer stacked in sequence;

wherein one of the first electrode layer and the second electrode layer is provided with a slit electrode; the array substrate further comprises a plurality of data lines, and a part of the data lines adjacent to the slit electrode extends linearly along a column direction;

wherein the slit electrode is provided with a plurality of slits, the slits comprise a first slit section, and an angle between an extending direction of the first slit section and a row direction is in a range of 69° to 85°;

wherein, among two of the slits adjacent in the row direction, extending directions of the first slit sections of the two of the slits are mirror-symmetrical with respect to the column direction; or among two of the slits adjacent in the column direction, extending directions of the first slit sections of the two of the slits are mirror-symmetrical with respect to the row direction.

* * * * *